United States Patent
Kim

(10) Patent No.: US 8,391,423 B2
(45) Date of Patent: Mar. 5, 2013

(54) ESTIMATING METHOD FOR MAXIMUM CHANNEL DELAY AND CYCLIC PREFIX (CP) AVERAGING METHOD IN OFDM RECEIVER

(75) Inventor: Beom-Jin Kim, Seongnam (KR)

(73) Assignee: FCI Inc., Gyeonggi-do (KR)

( * ) Notice: Subject to any disclaimer, the term of this patent is extended or adjusted under 35 U.S.C. 154(b) by 312 days.

(21) Appl. No.: 12/822,167

(22) Filed: Jun. 23, 2010

(65) Prior Publication Data

US 2010/0329400 A1    Dec. 30, 2010

(30) Foreign Application Priority Data

Jun. 25, 2009    (KR) .......................... 10-2009-0056831

(51) Int. Cl.
*H04L 27/06*    (2006.01)

(52) U.S. Cl. ........ 375/340; 375/260; 375/262; 375/267; 375/346; 375/347; 375/146; 375/147; 375/316

(58) Field of Classification Search .................. 375/340, 375/346, 260, 262, 265, 267, 347, 350; 370/203, 370/204, 205, 208, 209, 210
See application file for complete search history.

(56) References Cited

U.S. PATENT DOCUMENTS

| | | | | |
|---|---|---|---|---|
| 6,229,840 | B1 * | 5/2001 | Ichihara | 375/147 |
| 7,292,609 | B2 * | 11/2007 | Oura | 370/519 |
| 7,609,773 | B2 * | 10/2009 | Bhushan et al. | 375/260 |
| 8,036,291 | B2 * | 10/2011 | Gu et al. | 375/260 |
| 8,130,857 | B2 * | 3/2012 | Kim et al. | 375/267 |
| 2011/0013687 | A1 * | 1/2011 | Li | 375/232 |

* cited by examiner

Primary Examiner — Dhaval Patel

(57) ABSTRACT

An estimating method for maximum channel delay and cyclic prefix (CP) averaging method in orthogonal frequency division multiplexing (OFDM) receiver are described. Specifically, the estimating method performs the estimation of the maximum channel delay by adding the CP and the main OFDM signal for increasing the signal-to-noise ratio (SNR) and for reducing the inter-carrier interference (ICI). The CP averaging method is used to acquire a portion of the CP by using the maximum channel delay so as to increase the performance of the OFDM receiver.

14 Claims, 8 Drawing Sheets

ESTIMATING METHOD FOR MAXIMUM CHANNEL DELAY AND CYCLIC PREFIX (CP) AVERAGING METHOD IN OFDM RECEIVER

CLAIM OF PRIORITY

This application claims priority to Korean Patent Application Publication No. 10-2009-0056831 filed on Jun. 25, 2009.

FIELD OF THE INVENTION

The present invention relates to an estimating method, and more particularly to an estimating method for maximum channel delay and cyclic prefix (CP) averaging method in orthogonal frequency division multiplexing (OFDM) receiver, wherein the estimating method estimates the maximum channel delay by adding the CP and the main OFDM signal for increasing the signal-to-noise ratio (SNR) and for reducing the inter-carrier interference (ICI), and the CP averaging method is used to acquire a portion of the CP by using the maximum channel delay.

BACKGROUND OF THE INVENTION

Conventionally, the orthogonal frequency division multiplexing (OFDM) is one kind of broadband modulation scheme for telecommunication by dividing the distributed frequency band domain into a plurality of narrow frequency sub-bands wherein each of includes the sub-carriers of wireless frequency, i.e. radio frequency (RF), and each of sub-carriers in one channel is mathematically orthogonal to each of sub-carriers in another channel. The orthogonal status between sub-carriers allows the respective spectrum of the sub-carrier to be superposed with other carrier in no interference mode. Since the distributed frequency band domain is divided into a plurality of narrow frequency sub-bands, the OFDM scheme efficiently utilizes distributed frequency band domain by higher data transmission speed.

While performing the above-mentioned OFDM scheme, the cyclic prefix corresponding to the length and the maximum multipath delay is located in the front of the main OFDM symbol in order to eliminate the multipath fading which results in inter-symbol interference (hereinafter abbreviated as ISI). However, the above-identified method only eliminates the ISI when the length of the CP is smaller than the maximum multipath delay due to the multipath fading. Further, such a method disadvantageously results in system redundancy and degrades the spectral efficiency. Specifically, the CP is a signal which is inserted to the guard interval (GI) to prevent inter-channel interference and the GI is inserted to cancel the ISI resulting from the multipath fading during the OFDM transmission. However, when no signal is located in the GI, the orthogonal status between inter-carriers and the inter-channel interference occurs. A portion of signal in the rear of the inter symbol interval is copied and inserted, which is termed as cyclic prefix (CP).

The drawback of the above-identified OFDM method is that the operation efficiency of the receiver is downgraded while the inter-carrier interference (ICI) occurs when the carrier frequency offset exists and the channel variation resulting from the status change between the receiver and the transmitter is generated.

In this case, the signals in the rear of the cyclic prefix (CP) and the main OFDM are identical since no ISI exists. Therefore, the CP in the OFDM receiver should not be cancelled but add the CP to the main OFDM and average the CP in order to increase the operation performance including: the improvement of the signal-to-noise ratio (SNR) of the averaged CP in the main OFDM symbol and inter-carrier interference.

According to the above-mentioned descriptions, the cyclic prefix (CP) without ISI is utilized while performing the CP averaging method. If the signal with the ISI component is used to average the CP, the operation performance of the receiver will be reduced. As a result, there is a need to estimate the maximum channel delay so that the CP averaging method is performed by signal without ISI component.

Although the conventional CP averaging method is provided, channel delay spread is utilized. However, the estimation method of maximum channel delay is not provided but the channel delay spread is disclosed. In addition, the estimation method of maximum channel delay and the CP averaging method thereof in the OFDM receiver are not disclosed even if the channel delay spread is widely used.

SUMMARY OF THE INVENTION

The objective of the present invention is to provide an estimating method for maximum channel delay and cyclic prefix (CP) averaging method in orthogonal frequency division multiplexing (OFDM) receiver. Specifically, the estimating method estimates the maximum channel delay by adding the CP and the main OFDM signal for increasing the signal-to-noise ratio (SNR) and for reducing the inter-carrier interference (ICI) in order to increase the performance of OFDM receiver.

According to the above objective, the present invention sets forth an estimating method and CP averaging method. The estimating method is for maximum channel delay in orthogonal frequency division multiplexing (OFDM) receiver. The estimating method comprises the steps of: estimating an average power of a channel impulse response (CIR); multiplying the average power by an adjustable constant for determining a first threshold; assigning a respective sampling power of the CIR to zero for suppressing noise component thereof when the respective sampling power is smaller than the first threshold; and estimating a maximum channel delay of the CIR having the suppressed noise component.

The channel impulse response (CIR) is divided into a plurality of delay groups and energy of the delay groups is calculated wherein the length of each of delay groups is greater than one. The size of delay groups is set as 50 μs which is the maximum channel delay of typical urban 6 (TU6) channel, and the delay size of delay group is greater than the power of 2 of the maximum channel delay of the TU6 channel.

The energy of the delay groups is accumulated during a plurality of OFDM symbols, and the average power of the CIR is accumulated during the OFDM symbols to acquire an accumulated CIR average power for estimation. The accumulated CIR average power is multiplied by the adjustable constant for determining a second threshold, and the accumulated energy of the delay groups is compared with the second threshold to acquire a delay index of the delay groups having maximum delay, which are greater than the second threshold, for determining the maximum channel delay.

The adjustable constant for the second threshold is increased when either Doppler spread or channel variation is increased, the adjustable constant for the second threshold is decreased when either Doppler spread or channel variation is decreased, and the adjustable constant for the second threshold is decreased in higher order modulation.

The estimating method is for maximum channel delay in orthogonal frequency division multiplexing (OFDM)

receiver. The estimating method comprises the steps of: estimating an average power of a channel impulse response (CIR); multiplying the average power by an adjustable constant for determining a first threshold, differentiating the CIR from delay channel component and undesired noise component by the first threshold, and suppressing the undesired noise component; dividing the CIR into a plurality of delay groups and calculating the energy of the delay groups for estimating the average power of the CIR within the delay groups; accumulating the calculated energy of the delay groups during a predetermined amount of a plurality of OFDM symbols; accumulating the estimated average power of the CIR during the predetermined amount of the OFDM symbols; and determining a second threshold based on the estimated average power of the CIR, comparing the accumulated energy of the delay groups with the second threshold, and detecting the delay groups having maximum delay, which are greater than the second threshold, for determining the maximum channel delay.

The cyclic prefix (CP) averaging method by utilizing the following equations according to the estimating method of the maximum channel delay:

$$\text{the starting point of the prepared CP} = L*(D+1) \quad \text{(E1); and}$$

$$\text{the end point of the prepared CP} = \text{the end point of the CP} \quad \text{(E2),}$$

wherein L represents the size of delay groups and D represents the delay index of the delay groups having maximum delay.

The estimating method for maximum channel delay and cyclic prefix (CP) averaging method in orthogonal frequency division multiplexing (OFDM) receiver. Specifically, the estimating method performs the estimation of the maximum channel delay by adding the CP and the main OFDM signal for increasing the signal-to-noise ratio (SNR) and for reducing the inter-carrier interference (ICI) so as to increase the performance of the OFDM receiver.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
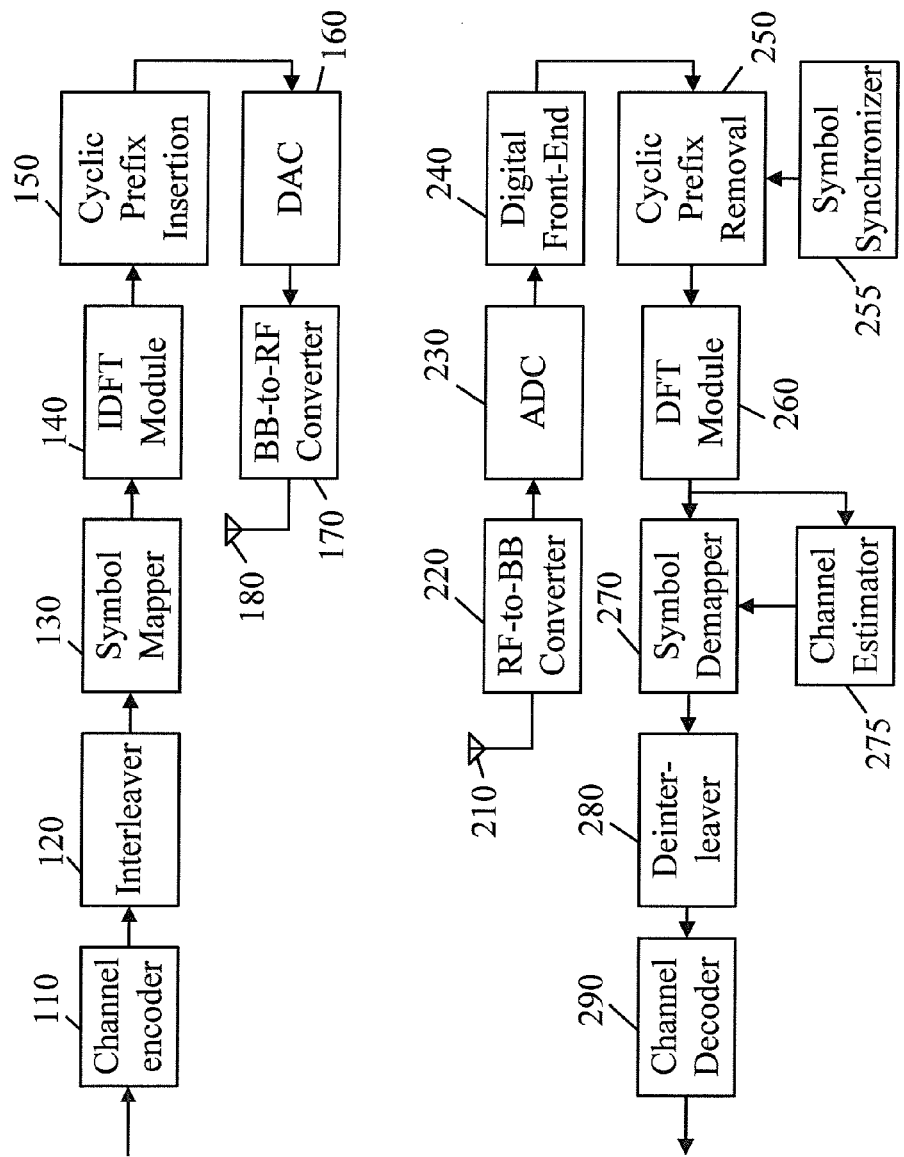
FIG. 1 is a schematic block diagram of a conventional orthogonal frequency division multiplexing (OFDM) transceiver.
Figure 2:
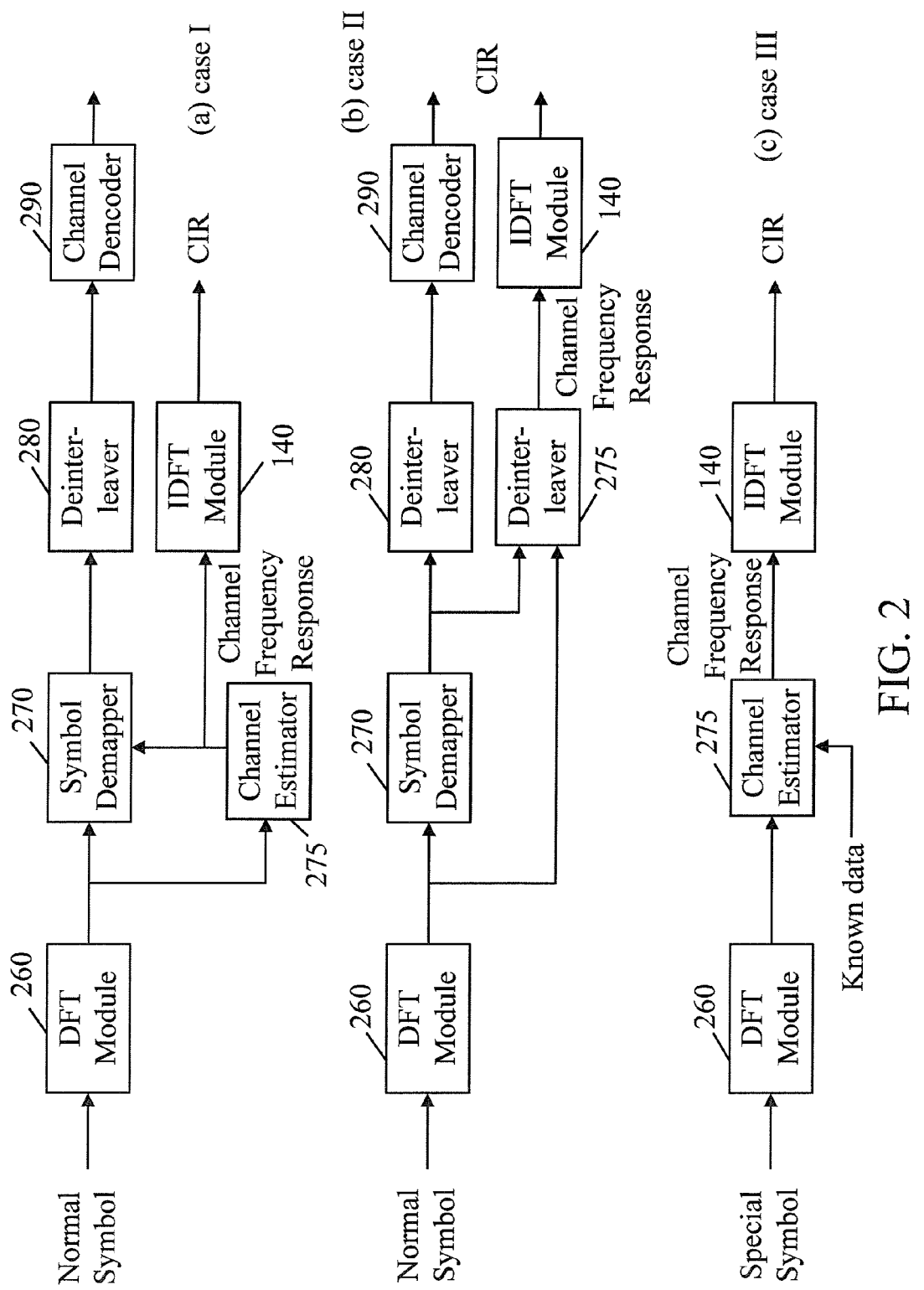
FIG. 2 is a schematic block diagram of generating the conventional channel impulse response (CIR) with respect to three cases.
Figure 3:
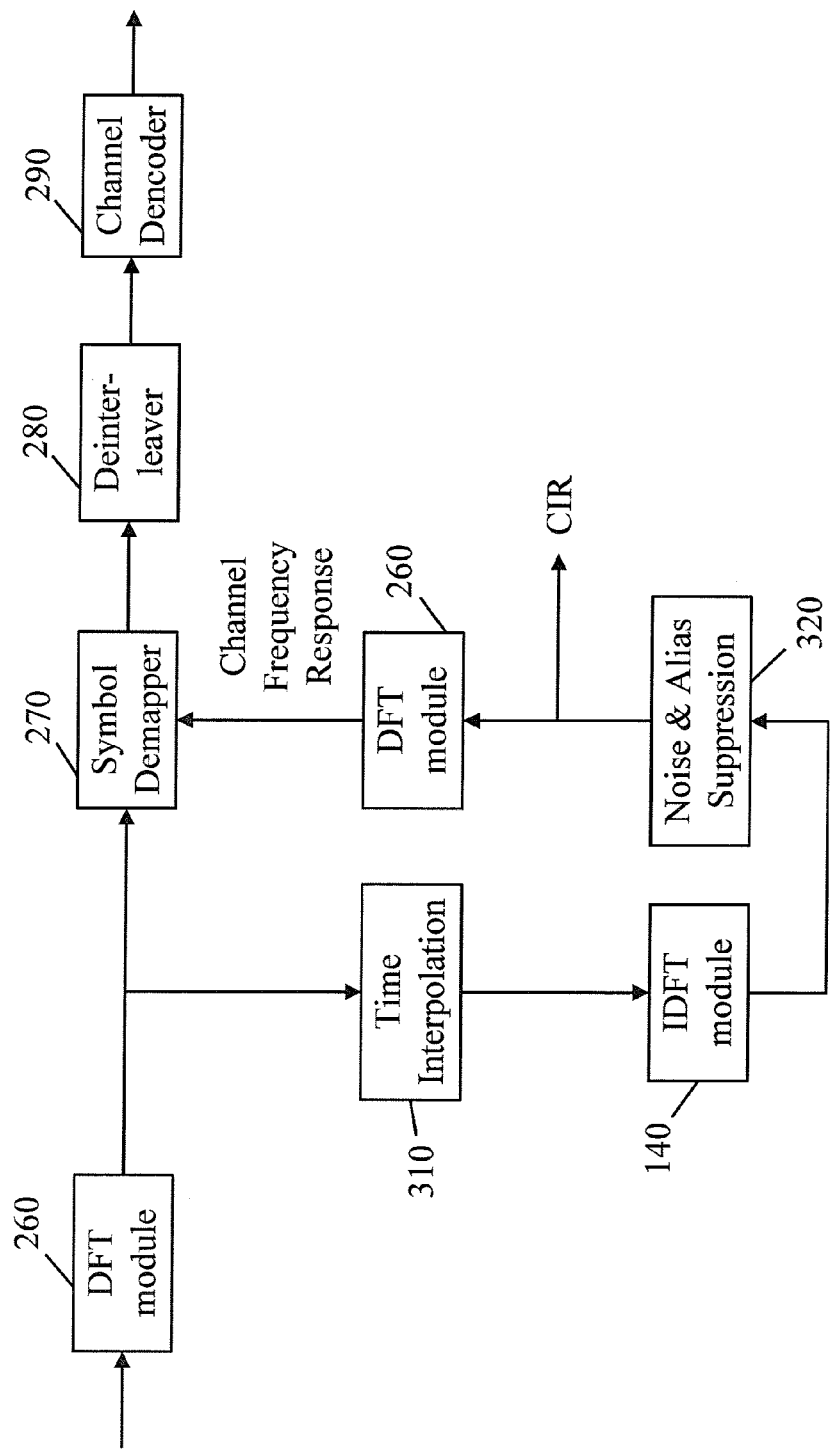
FIG. 3 is a schematic view of a conventional channel estimation method by the frequency interpolation of the inverse discrete Fourier transform (IDFT)

Please refer to FIGS. 1-3. FIG. 1 is a schematic block diagram of a conventional orthogonal frequency division multiplexing (OFDM) transceiver. FIG. 2 is a schematic block diagram of generating the conventional channel impulse response (CIR) with respect to three cases. FIG. 3 is a schematic view of conventional channel estimation method by the frequency interpolation of the inverse discrete Fourier transform (IDFT).

FIG. 1 shows a typical OFDM transceiver including transmitter and receiver. The OFDM transmitter includes a channel encoder 110, an interleaver 120, a symbol mapper 130, a IDFT module 140, a cyclic prefix insertion 150, a digital-to-analog converter (DAC) 160, a baseband to radio frequency (BB-to-RF) converter 170, and an antenna 180.

In this case, the channel encoder 110 is capable of increasing the reliability of the transceiver to the additive white Gaussian noise (AWGN), multipath fading and time-selective fading interference by adding a small amount of redundancy information or parity check to the original data.

The interleaver 120 converts the interval error into discrete error while the decoding ability of the channel coding device to the interval error is weak.

The symbol mapper 130 is a processing module to map the bit stream to the symbols. The symbol mapper 130 performs modulation schemes, such as M-quadrature amplitude modulation (M-QAM) and M-phase shift keying (M-PSK).

The IDFT module 140 performs the OFDM modulation. The cyclic prefix insertion 150 eliminates the inter-symbol interference (ISI) effect which results from the multipath fading wherein the length of the symbol is smaller than a predetermined length. That is, the cyclic prefix insertion 150 adds the rear portion of the main OFDM to the front portion of the symbol until the signal is in form of bit stream before the cyclic prefix insertion 150. The digital-to-analog converter (DAC) 160 converts the digital signal to an analog baseband signal. Finally, the baseband to radio frequency (BB-to-RF) converter 170 transforms the analog baseband signal to a radio frequency signal and the antenna 180 transmits the radio frequency.

As shown in FIG. 1, the OFDM receiver includes antenna 210, a radio frequency to baseband (RF-to-BB) converter 220, an analog-to-digital converter (ADC) 230, a digital front-end 240, a cyclic prefix removal 250, a discrete Fourier transform (DFT) module 260, a symbol synchronizer 255, a channel estimator 275, a symbol demapper 270, a deinterleaver 280, and a channel decoder 290.

When the OFDM receiver is operated, the antenna 210 receives a radio frequency signal and the RF-to-BB converter 220 converts the radio frequency signal into an analog baseband signal. The analog-to-digital converter (ADC) 230 then converts the analog baseband signal into digital baseband signal. The digital front-end 240 has several elements for different corresponding functions, including the elements and functions of auto gain control (AGC), direct current (DC) offset cancellation, IQ unbalance compensator, an adjacent channel interference (ACI)/co-channel interference (CCI) filter, carrier frequency error compensator, and sampling frequency error compensator.

The symbol synchronizer 255 and the cyclic prefix removal 250 are used to eliminate cyclic prefix after finding the starting point of the main OFDM symbol without ISI component and the cyclic prefix removal 250 transmits the main OFDM to DFT module 260.

The channel estimator 275 estimates the frequency response of the channel and the symbol demapper 270 demaps is used to restore the bit stream. In most cases, a soft decision makes a soft value based on form of the bit stream but not on binary codes, and the soft value is then issued to the deinterleaver 280.

The deinterleaver 280 performs reverse procedure in relative to the interleaver 120 of the OFDM transmitter. The channel decoder 290 corrects and/or detects the signal errors in the channel by the additive redundancy information or parity check.

In the OFDM receiver, the DFT module 260 processes the received signal and the symbol demapper 270 demaps the bit stream. In one case of symbol mapping, e.g. PSK control or orthogonal amplitude modulation, the channel estimator 275 estimates the channel frequency response for the purpose of demapping process. In another case of differential modulation, e.g. terrestrial-digital multimedia broadcasting (T-DMB), it is not necessary to estimate the channel frequency response for the purpose of demapping process.

The OFDM receiver utilizes several kinds of manners to generate the channel impulse response (CIR). As shown in case I of FIG. 2, the channel estimator 275 estimates the channel frequency response and the IDFT module 140 processes the estimated channel frequency response to generate the CIR. As shown in case II of FIG. 2, if it is not necessary to estimate the channel frequency response, the symbol demapper 270 demaps the bit stream from the DFT module 260 to generate the channel frequency response and the channel frequency response is outputted to the IDFT module 140 to generate the CIR.

In most cases, for the purpose of the symbol and frequency synchronizations, the OFDM receiver further periodically transmits special symbols besides general symbols. For example, the flag symbols are transmitted at the interval, e.g. 25 ms, in the CMMB mobile television system. The phase reference symbols are periodically transmitted at the interval in the T-DMB mobile television system. The long/short training symbols are periodically transmitted by the form of frame in the wireless local area network (WLAN). As shown in case III of FIG. 2, after the DFT module 260 processes the special symbols, the channel estimator 275 estimates the known frequency domain data to generate the channel frequency response. The channel frequency response is then outputted to the IDFT module 140 to generate the CIR.

Alternatively, as shown in case I of FIG. 2, the channel estimator 275 is able to generate the CIR. For example, the channel estimator 275 estimates the channel frequency response by the time interpolation 310 and the frequency interpolation within the system having a leading frequency of sub-carrier. In view of frequency interpolation, after the IDFT module 140 processes the output result of the time interpolation 310 for generating the CIR, the noise/alias suppression 320 suppresses the undesired component, e.g. aliasing component, of the CIR. That is, after the undesired component in the CIR is cancelled, the desired CIR is acquired, as shown in FIG. 3.

Figure 4:
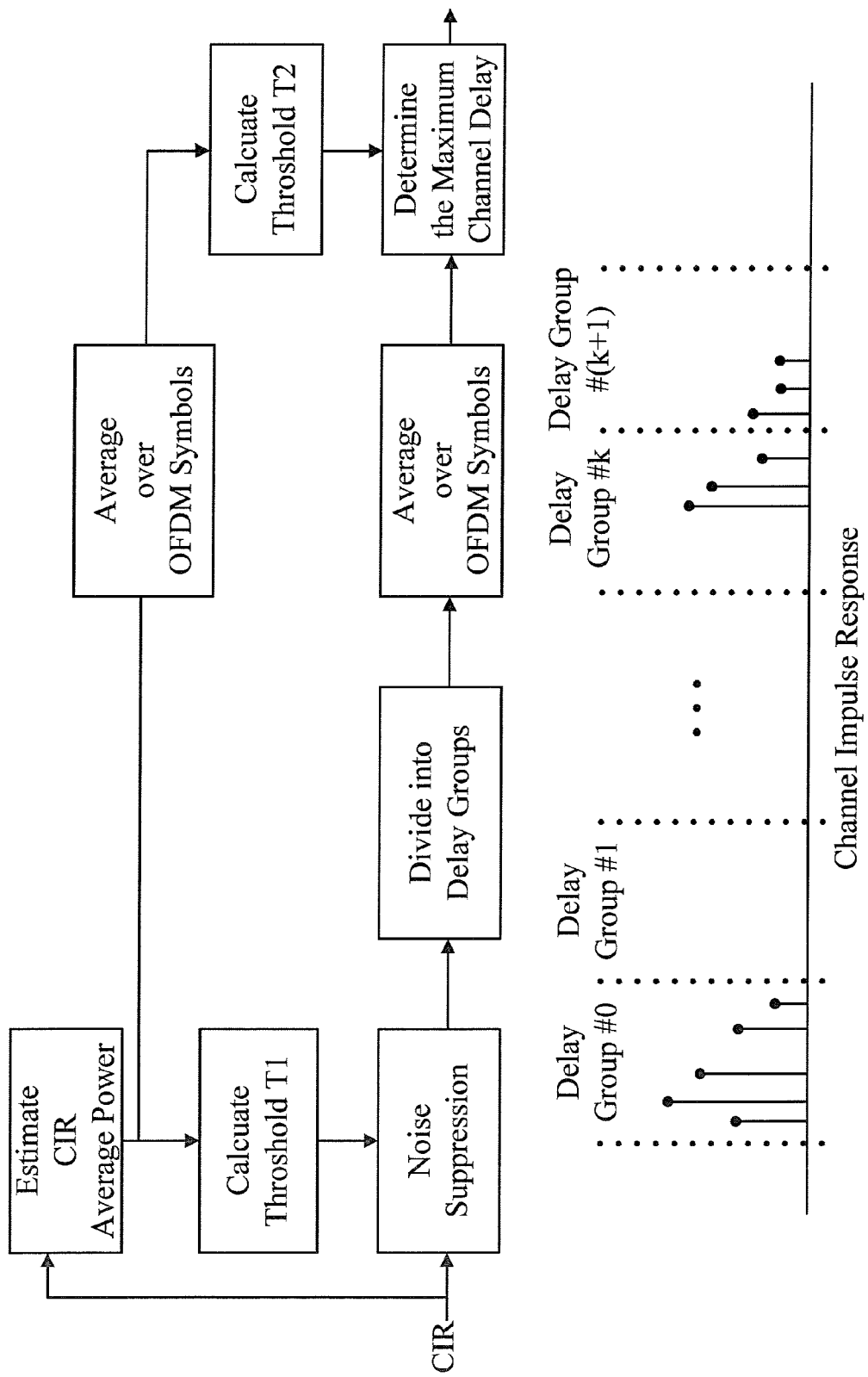
FIG. 4 is a schematic view of an estimation method of maximum channel delay according to one embodiment of the present invention.
Figure 5:
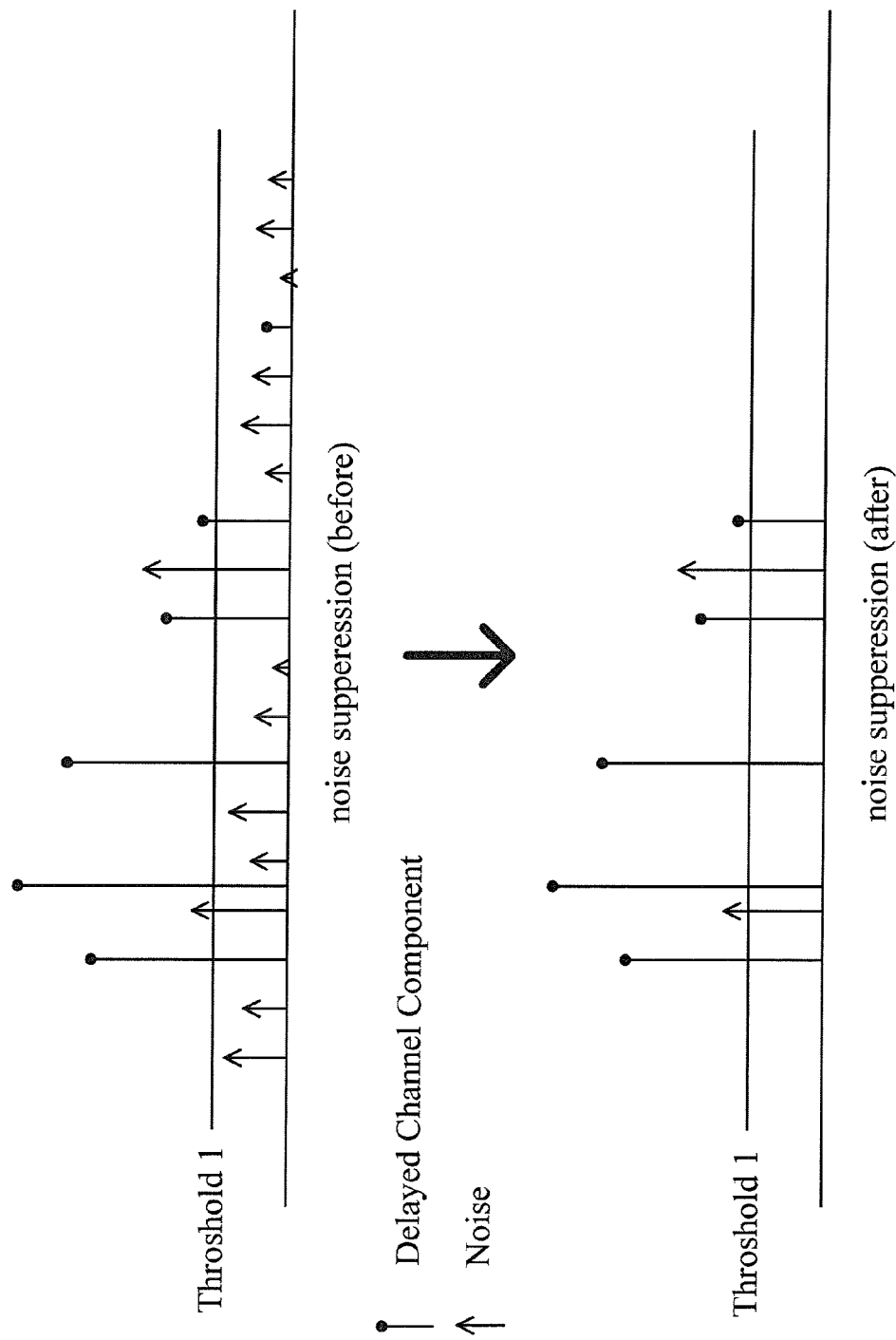
FIG. 5 is a schematic view of noise suppression shown in FIG. 4 according to one embodiment of the present invention.
Figure 6:
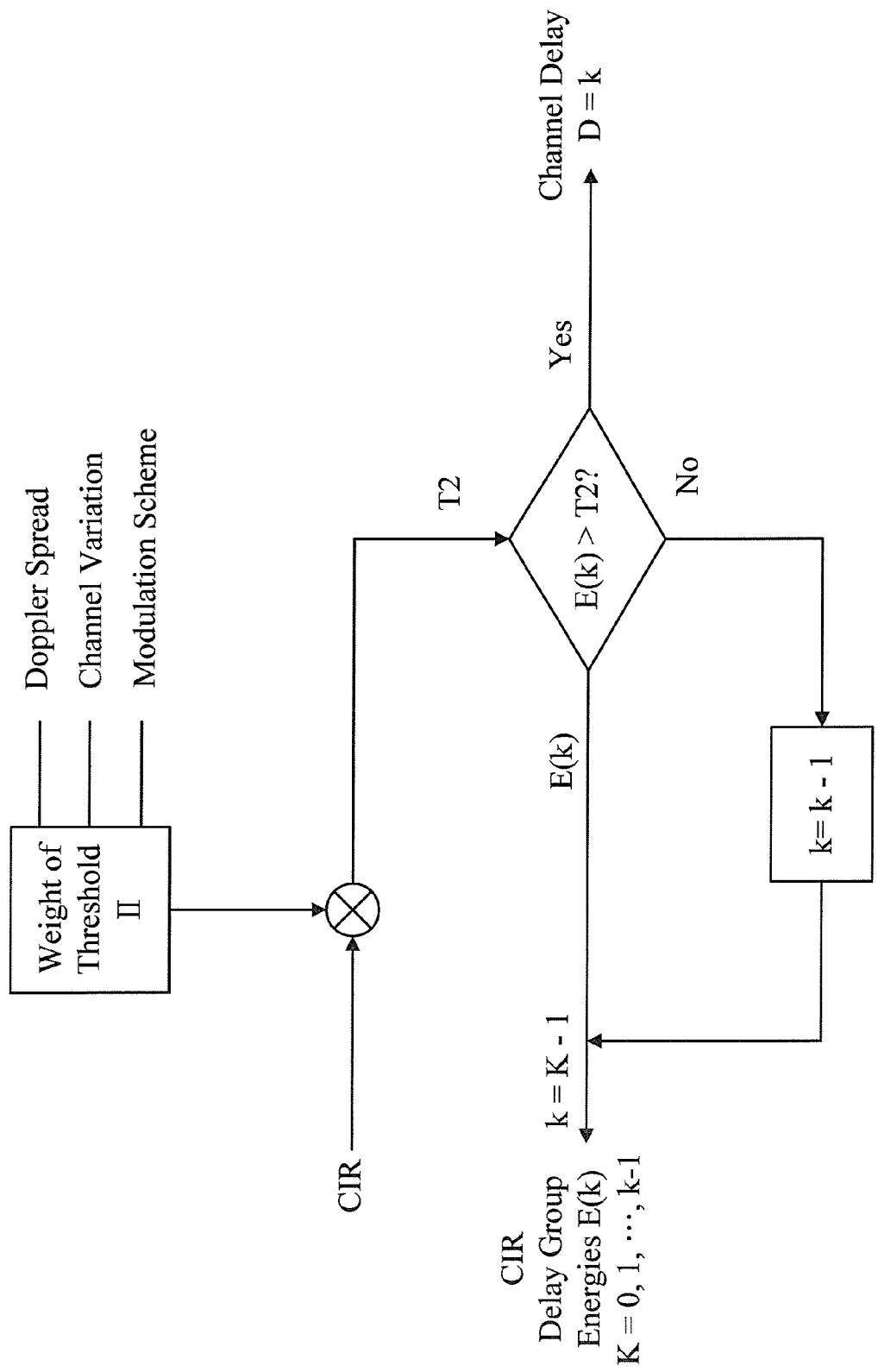
FIG. 6 is a schematic view of the maximum channel delay according to one embodiment of the present invention.
Figure 7:
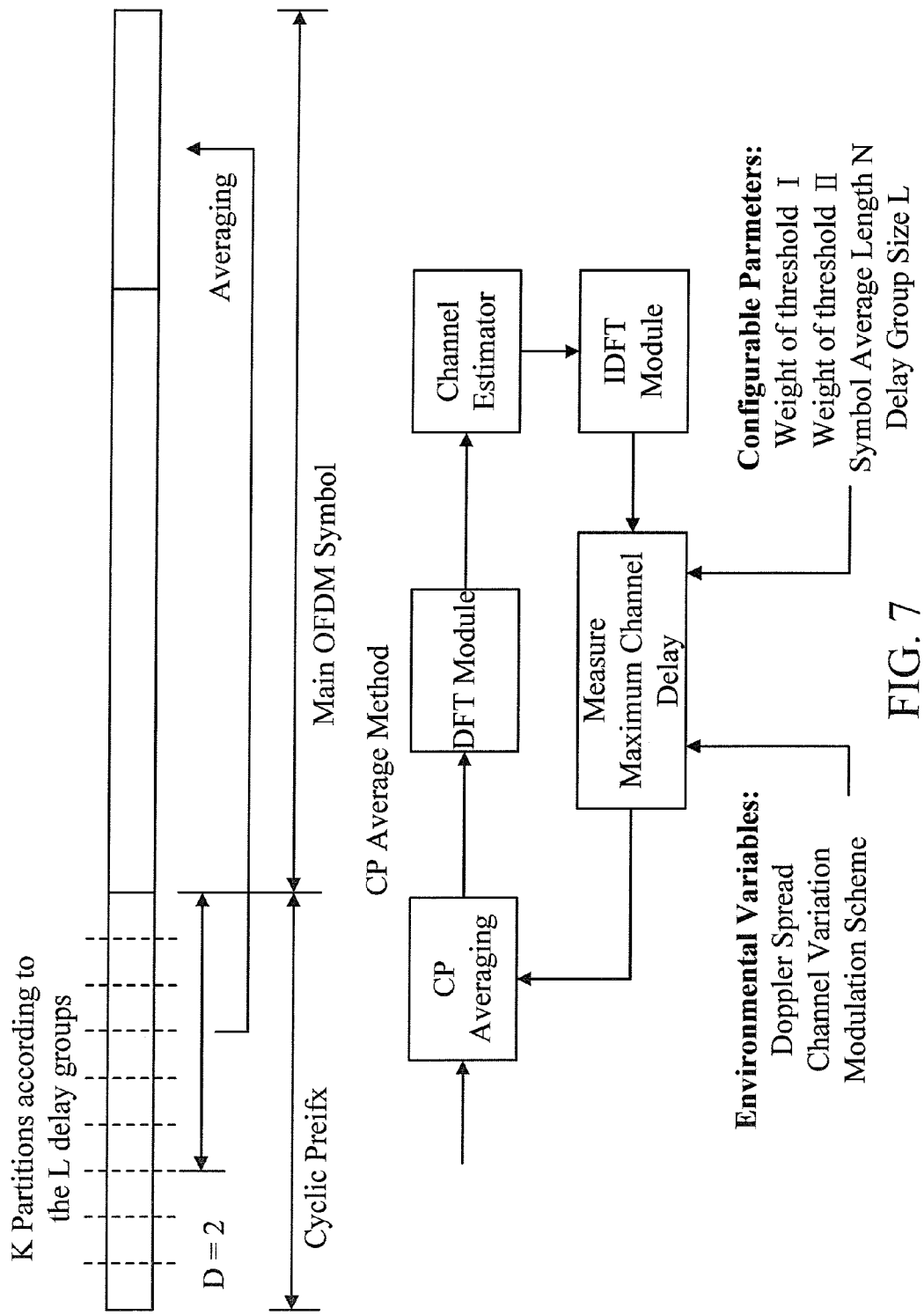
FIG. 7 is a schematic view of the cyclic prefix (CP) averaging method by employing the estimation method of maximum channel delay according to one embodiment of the present invention.
Figure 8:
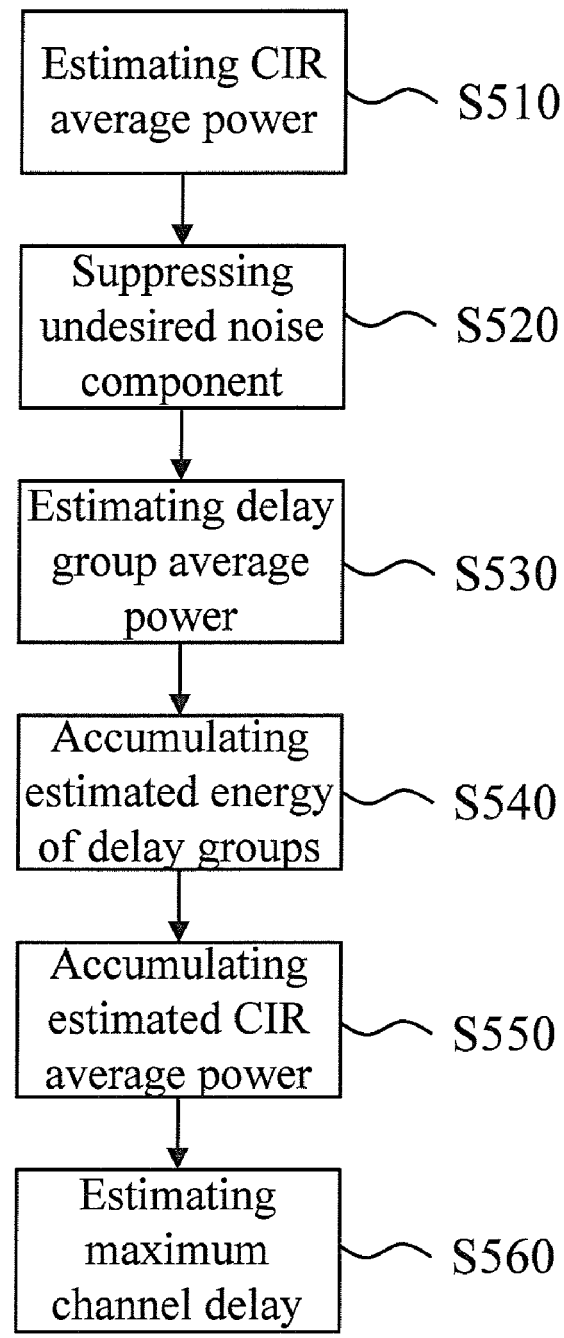
FIG. 8 is a flow chart of performing the estimation method of maximum channel delay according to one embodiment of the present invention.

The present invention employs the CIR to generate the maximum channel delay. Please refer to FIGS. 4-8. FIG. 4 is a schematic view of the estimation method of maximum channel delay according to one embodiment of the present invention. FIG. 5 is a schematic view of noise suppression shown in FIG. 4 according to one embodiment of the present invention. FIG. 6 is a schematic view of the maximum channel delay according to one embodiment of the present invention. FIG. 7 is a schematic view of the cyclic prefix (CP) averaging method by employing the estimation method of maximum channel delay according to one embodiment of the present invention. FIG. 8 is a flow chart of performing the estimation method of maximum channel delay according to one embodiment of the present invention.

As shown in FIG. 4 and FIG. 8, a plurality of processing module utilizes the CIR signal to generate the maximum channel delay and the estimation of the maximum channel delay is described as follows. In step S510, the estimate CIR average power module estimates an average power of the CIR.

Afterwards, the estimated average power of the CIR signal is multiplied by an adjustable constant to determine the first threshold T1. For example, T1=$\lambda$*x, where $\lambda$ is the adjustable constant and "x" is CIR average power. The first threshold T1 differentiates the CIR from delay channel component and undesired noise component. In step S520, the noise suppression is used to suppress the undesired noise component.

In step S530, the sampled CIR is divided into a plurality of delay groups and the average power estimation module calculates the energy of each of the delay groups for estimating the average power of the CIR within the delay groups. An accumulation delay group operation module accumulates the calculated energy of the delay groups during a predetermined amount of a plurality of OFDM symbols. That is, the accumulation delay group operation module performs the accumulation of the energy of the delay groups, as shown in step S540.

An accumulation delay group operation module performs accumulation operation according to the estimated average power of the CIR during the interval of predetermined amount of OFDM symbols. That is, the accumulation delay group operation module accumulates the estimated average power of the CIR, as shown in step S550.

Finally, in step S560, a maximum channel delay estimation module is used to estimate the maximum channel delay of the OFDM receiver. The maximum channel delay estimation module determines a second threshold T2 based on the estimated average power of the CIR. The accumulated energy of the delay groups is compared with the second threshold T2 for detecting the delay groups having maximum delay, which are greater than the second threshold T2, for determining the maximum channel delay.

Furthermore, as shown in FIG. 5, after differentiating the CIR from delay channel component and noise component, the noise component is cancelled to generate more accurate CIR for precisely estimating the maximum channel delay. Specifically, the maximum channel delay is determined based on the average power and the respective sampling power of the CIR.

Generally, the SNR of the OFDM receiver during operation is greater than 0 dB and the sampling amount corresponding to the delay channel component in the CIR signal is smaller than the total sampling amount. That is, the power of the CIR concentrates on a portion of the sampling delay channel component. Therefore, the sampling average power of the delay channel component is greater than the sampling average power having the noise component. The OFDM receiver determines the threshold according to this feature and the sampling power which is smaller than the threshold is deemed that the delay channel component does not exist but only the noise component exists. Thus, the determination of the average power of the delay group is more accurate.

In addition, the present invention divides the CIR signal with noise suppression into a predetermined sampling amount of delay groups. After the energy of each of delay group is calculated, the maximum channel delay is estimated based on the calculated energy so that the OFDM receiver can definitely determine whether the delay channel component exists or not.

When the delay channel component in the delay groups exists, the delay channel component is retained during the noise suppression procedure. Generally, the delay channel spectrum has basic channel impulse response (CIR) profile which is composed of delayer version. For example, TU6 channel is converted into CIR profile and mobile single frequency network (SFN) channel is composed of CIR profile of the TU6 channel and the delayer version thereof.

If the delay group enough includes the basic channel impulse response (CIR) profile, the total energy of the delay groups is considerably greater than the energy of the respective sampled delay channel component. Further, if the noise component exists, most of the noise component is suppressed during noise suppression procedure and a small amount of noise component remains. Further, the noise component itself in the respective sampled delay channel is smaller than the signal. Therefore, the energy of the retained delay channel component having small amount of noise component is approximately the same of the energy of the respective sampled delay channel component. Therefore, the energy of the delay group composed of the respective samples with delay channel component is considerably greater than the energy of the delay group composed of the respective samples without delay channel component.

Moreover, the manner of dividing the sampled CIR into a plurality of delay groups can reduce the allocated memory capacity while calculating the accumulated value of the OFDM symbols. Specifically, if the delay size of the delay group is "L" and the allocated memory capacity is reduced as "1/L".

In one preferred embodiment, the delay size of the delay group is based on the delay size of the basic channel impulse response (CIR) profile. For example, the delay size of the TU6 channel is 50 μs. The delay size is equal to 46 samples in 8 MHz bandwidth mode (+8K mode) of digital video broadcasting handheld (DVB-H) and the delay size is equal to 50 samples in 8 MHz bandwidth mode of CMMB.

In one embodiment, since the length of cyclic prefix is represented as the power of 2, the delay size of the delay group is represented as the power of 2. In one preferred embodiment, the delay size of delay group is greater than or equal to the power of 2 about the CIR delay size. For example, the sampling amount in DVB-H and CMMB is 64.

Additionally, the OFDM transmitter and receiver have relative channel variation based on the CIR in time domain. It is necessary to estimate the average maximum channel delay according to the time domain so that the energy of delay groups of the CIR is accumulated during a predetermined amount of OFDM symbols. In this case, the CIR average power for determining the second threshold T2 is also accumulated in the predetermined amount of OFDM symbols wherein the second threshold T2 is used to determine the maximum channel delay.

During the step of estimating the maximum channel delay (S560), the accumulated energy of each of the delay groups is greater than the second threshold T2 generated by the accumulated CIR average power. In one preferred embodiment, the second threshold T2 is represented as the equation of: $T2=\alpha*x$, where $\alpha$ is the adjustable constant and "x" is accumulated CIR average power. In one case, $\alpha$ is assigned as a fixed value, as shown in FIG. 6. In another case, $\alpha$ is assigned as an adaptive value.

When $\alpha$ is increased, the smaller delay channel component may be ignored and thus the cyclic prefix may be used in CP averaging method. If the ignored delay channel component has ISI, the performance of receiver degraded. On the contrary, if most of the cyclic prefixes (CP) are employed, the effects of the noise and ICI suppressions are increased. As a result, the following methods are adaptively employed.

First, after the value of channel variation or Doppler spread is measured, $\alpha$ is assigned to the most of the cyclic prefixes (CP) for the CP averaging method since ICI has a considerable effect if these values are increased.

Second, since the receiver is sensitive to ISI in higher order modulation, $\alpha$ is assigned to smaller value so that the smaller delay channel component is detected to improve the effect of the ISI.

In the present invention, the delay index of the delay groups having maximum delay is defined as D and the maximum channel delay D is used to the cyclic prefix (CP) while performing the CP averaging method.

The starting point of the prepared CP=$L*(D+1)$ (E1); and

The end point of the prepared CP=the end point of the CP (E2), wherein L represents the size of delay groups and D represents the delay index of the delay groups having maximum delay.

The present invention provides $\lambda$ for determining the first threshold T1, $\alpha$ for determining the second threshold T2, the size of delay group L, and OFDM symbols N for accumulation, which are parametric values. For example, in the case of hard-wired logic, these parametric values can be set by the register. Based on the receiver, the channel environmental variables, modulation schemes, these parametric values can be properly set. Specifically, the parametric value $\alpha$ is used to detect Doppler spread for increasing the performance of the CP averaging method.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An estimating method for maximum channel delay in orthogonal frequency division multiplexing (OFDM) receiver, the estimating method comprising the steps of:
   estimating an average power of a channel impulse response (CIR);
   multiplying the average power by an adjustable constant for determining a first threshold;
   assigning a respective sampling power of the CIR to zero for suppressing noise component thereof when the respective sampling power is smaller than the first threshold; and
   estimating a maximum channel delay of the CIR having the suppressed noise component.

2. The method of claim 1, wherein the channel impulse response (CIR) is divided into a plurality of delay groups and the energy of the delay groups is calculated wherein a length of each of delay groups is greater than one.

3. The method of claim 2, wherein the estimated maximum channel delay utilizes the following equations for performing the cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

4. The method of claim 2, wherein a size of delay groups is set as 50 μs which is the maximum channel delay of a Typical Urban 6 (TU6) channel, and the delay size is greater than a power of 2 of the maximum channel delay of the TU6 channel.

5. The method of claim 4, wherein the estimated maximum channel delay utilizes the following equations for performing the cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

6. The method of claim 2, wherein the energy of the delay groups is accumulated during a plurality of OFDM symbols, and the average power of the CIR is accumulated during the OFDM symbols to acquire an accumulated CIR average power for estimation.

7. The method of claim 6, wherein the estimated maximum channel delay utilizes the following equations for performing the cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

8. The method of claim 6, wherein the accumulated CIR average power is multiplied by the adjustable constant for determining a second threshold, and the accumulated energy of the delay groups is compared with the second threshold to acquire a delay index of the delay groups having maximum delay, which are greater than the second threshold, for determining the maximum channel delay.

9. The method of claim 8, wherein the estimated maximum channel delay utilizes the following equations for performing the cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

10. The method of claim 8, wherein the adjustable constant for the second threshold is increased when either Doppler spread or channel variation is increased, the adjustable constant for the second threshold is decreased when either Doppler spread or channel variation is decreased, and the adjustable constant for the second threshold is decreased in higher order modulation.

11. The method of claim 10, wherein the estimated maximum channel delay utilizes the following equations for performing a cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

12. The method of claim 1, wherein the estimated maximum channel delay utilizes the following equations for performing the cyclic prefix (CP) averaging method:

the starting point of the prepared CP=$L*(D+1)$ (E1); and the end point of the prepared CP=the end point of the CP (E2), wherein L represents the size of delay groups and D represents the delay index of the delay groups having maximum delay.

13. An estimating method for maximum channel delay in orthogonal frequency division multiplexing (OFDM) receiver, the estimating method comprising the steps of:
estimating an average power of a channel impulse response (CIR);
multiplying the average power by an adjustable constant for determining a first threshold, differentiating the CIR from delay channel component and undesired noise component by the first threshold, and suppressing the undesired noise component;
dividing the CIR into a plurality of delay groups and calculating the energy of the delay groups for estimating the average power of the CIR within the delay groups;
accumulating the calculated energy of the delay groups during a predetermined amount of a plurality of OFDM symbols;
accumulating the estimated average power of the CIR during the predetermined amount of the OFDM symbols; and
determining a second threshold based on the estimated average power of the CIR, comparing the accumulated energy of the delay groups with the second threshold, and detecting the delay groups having maximum delay, which are greater than the second threshold, for determining the maximum channel delay.

14. A cyclic prefix (CP) averaging method by utilizing the following equations according to claim 13 of the estimating method of the maximum channel delay:

the starting point of the prepared CP=$L*(D+1)$ (E1); and the end point of the prepared CP=the end point of the CP (E2), wherein L represents the size of delay groups and D represents the delay index of the delay groups having maximum delay.

* * * * *